(12) United States Patent
Shapira et al.

(10) Patent No.: US 12,530,519 B2
(45) Date of Patent: Jan. 20, 2026

(54) ELECTRICAL CIRCUIT DESIGN INSPECTION SYSTEM AND METHOD

(71) Applicant: CADY SOLUTIONS LTD., Ramat HaSharon (IL)

(72) Inventors: Gilad Shapira, Ramat HaSharon (IL); Tal Ben Porath, Tel Aviv (IL); Or Shabtai, Tel Aviv (IL)

(73) Assignee: CADY SOLUTIONS LTD., Ramat HaSharon (IL)

( * ) Notice: Subject to any disclaimer, the term of this patent is extended or adjusted under 35 U.S.C. 154(b) by 685 days.

(21) Appl. No.: 17/906,832

(22) PCT Filed: Mar. 25, 2021

(86) PCT No.: PCT/IL2021/050346
§ 371 (c)(1),
(2) Date: Sep. 20, 2022

(87) PCT Pub. No.: WO2021/191912
PCT Pub. Date: Sep. 30, 2021

(65) Prior Publication Data
US 2023/0153512 A1    May 18, 2023

Related U.S. Application Data

(60) Provisional application No. 62/994,362, filed on Mar. 25, 2020.

(51) Int. Cl.
*G06F 30/398* (2020.01)
*G06F 30/392* (2020.01)
(Continued)

(52) U.S. Cl.
CPC .......... *G06F 30/398* (2020.01); *G06F 30/392* (2020.01); *G06F 2115/12* (2020.01); *G06F 2119/06* (2020.01)

(58) Field of Classification Search
USPC ....................................................... 716/112
See application file for complete search history.

(56) References Cited

U.S. PATENT DOCUMENTS 8,555,237 B1   10/2013  Juneja et al.
8,650,515 B2    2/2014  Alam et al.
(Continued)

FOREIGN PATENT DOCUMENTS

CN    108090288 A    5/2018
CN    109923542 A    6/2019
(Continued)

OTHER PUBLICATIONS

The extended European Search Report for corresponding EP Appl 21775525.5, mailed on Jun. 20, 2023, 8 pages.
(Continued)

*Primary Examiner* — Bryce M Aisaka
(74) *Attorney, Agent, or Firm* — Vorys, Sater, Seymour and Pease LLP; Khaled Shami (57) ABSTRACT

An artificial intelligence (AI) based system and method for electrical design inspection, configured to autonomously extract, convert, and analyze data from electrical documentation related to electrical circuits by utilizing AI algorithms along with deterministic algorithms in order to produce output results.

19 Claims, 5 Drawing Sheets

(51) Int. Cl.
  *G06F 115/12* (2020.01)
  *G06F 119/06* (2020.01)

(56) References Cited

U.S. PATENT DOCUMENTS

| | | |
|---|---|---|
| 10,534,879 B2 | 1/2020 | Baker et al. |
| 2012/0226952 A1 | 9/2012 | Katz et al. |
| 2016/0131699 A1 | 5/2016 | Hamilton |
| 2016/0253445 A1 | 9/2016 | Pataky |
| 2017/0344669 A1 | 11/2017 | Jeong et al. |
| 2018/0268096 A1 | 9/2018 | Chuang et al. |
| 2018/0300434 A1* | 10/2018 | Hu .................. G03F 7/70508 |
| 2018/0307654 A1 | 10/2018 | Liszewski |
| 2019/0147134 A1 | 5/2019 | Wang et al. |

FOREIGN PATENT DOCUMENTS

| | | |
|---|---|---|
| JP | 2011-511990 A | 4/2011 |
| JP | 2018-139136 A | 9/2018 |

OTHER PUBLICATIONS

Botero et al., "Hardware Trust and Assurance through Reverse Engineering: A Survey and Outlook from Image Analysis and Machine Learning Perspectives", arxiv.org, Cornell University Library, 201 OLIN Library Cornell University, Ithaca, NY 14853, Feb. 11, 2020, 23 pages.
Kitaura et al., "Design Rule Extraction from DRC Rule Files, and Its Visualization", Information Processing Conference Journal, 2003, Information Processing Society, vol. 44, No. 5, pp. 1255-1265.
Hsiao et al., "Automating the Generation of Hardware Component Knowledge Bases", LCTES 2019 (ACM), pp. 163-176.

* cited by examiner

Pin Functions

| NAME | PIN WSON No. | PIN SOT-23 No. | Type | DESCRIPTION |
|---|---|---|---|---|
| CTRL | 5 | 2 | I | Control pin of the boost converter. It is a multifunctional pin which can be used for enable control. PWM and digital dimming. |
| COMP | 2 | 5 | O | Output of the transconductance error amplifier. Connect an external capacitor to this pin to compensate the converter. |
| FB | 1 | 6 | I | Feedback pin for current. Connect the sense resistor from FB to GND. |
| GND | 3 | 4 | O | Ground |
| SW | 4 | 3 | I | This is the switching node of the device. Connect the switched side of the inductor to SW. This pin is also used to sense the output voltage for open LED protection. |
| VIN | 6 | 1 | I | The input supply pin for the IC. Connect VIN to a supply voltage between 3V and 18V. |
| Thermal Pad | — | — | — | The thermal pad must be soldered to the analog ground plane. If possible, use thermal via to connect to ground plane for ideal power dissipation. |

*FIG. 5*

ELECTRICAL CIRCUIT DESIGN INSPECTION SYSTEM AND METHOD

FIELD OF THE INVENTION

The present invention relates to artificial intelligence (AI) based systems and methods for electrical design inspection, and, more particularly but not exclusively, to autonomously extracting information from electrical components documentation such as datasheets, etc., using AI algorithms and utilizing said information to perform automatic and comprehensive inspection of electrical schematic and layout representations of electrical circuits.

BACKGROUND OF THE INVENTION

Electrical circuits which comprise electrical components are the cornerstone of every modern electrical device. During recent decades, as the size of electrical components has decreased, the number of electrical components that could be embedded in or mounted on a given space has increased and, as a result, electrical circuits became much more complex. Said electrical components may be simple passive components such as resistors, capacitors, inductors, diodes, transistors, etc., and may also be sophisticated active components such as microprocessors, voltage regulators, sensors, etc.

In light of the above and due to their high complexity, electrical schematic and layout documentation of electrical circuits, such as printed circuit boards (PCB), electrical circuit comprises silicon-based chips, and other types of electrical circuitry, often contain errors/faults—ranging from simple and direct errors to complex logical errors.

A typical analog or digital electrical circuit, which may include complex analog or digital sub-circuits, is comprised of a variety of interconnected passive and active electrical components. Complex functionality can be achieved by connecting a plurality of electrical components together in various manners to create an electrical circuit such as a PCB.

The specific connections of electrical components forming an electrical circuit may be defined in numerous representations. An extremely common such representation is the netlist file, which is a description of the connectivity of an electrical circuit which comprises a list of its electrical components and their pins (which are also referred to as "nodes"), and the interconnections between various nodes. In other words, the netlist is the high-level description of the circuit connections, without referring to the geometrical properties of these connections (e.g. components' locations, number of layers, traces lengths, etc.). These geometrical properties are commonly represented in the layout file, which represents the entire geometry and topology of the circuit.

Typically, the process of developing new electrical circuits includes designing the electrical schematic and the layout of the circuit using a designated software and according to the desired circuit specifications, and then simulating and reviewing the design of the circuit (schematic and/or layout).

Currently, a significant segment of the design review is based on a human reading of all of the electrical components' datasheets, understanding from them the requirements of each component, and checking whether these requirements were complied with and upheld in the design. Once the circuit is designed, simulated and reviewed as described above, a physical implementation of the design, i.e. a prototype, is created and then tested (commonly known as the "Bring-Up" phase), to ensure it functions as desired. If the desired functionality is not obtained, the circuit returns to the design phase, the detected errors are corrected and the design goes through another "Bring-Up" phase, at which point other errors may be detected. This iterated process carries until no errors are detected at the "Bring-Up" phase. At this point, the electrical circuit may be commercially manufactured.

It may be costly and time-consuming to re-design the electrical circuit and re-create its physical implementation each time an error is detected only at the "Bring-Up" phase. Moreover, from time to time some errors are not detected even at the "Bring-Up" phase and make their way into the final product, compromising its reliability and posing a risk to the reputation of its manufacturer. Thus, it is desirable to detect as many errors as possible early on in the process, reducing the number of iterations and the risk of faulty products.

Various techniques exist for simulating and reviewing the design of the circuit (schematic and/or layout) in search of errors. These may include, among others, functional analysis, timing simulations, and logical equivalence checking, which compares a model of the circuit being designed to a reference model which describes the desired functionality of the electrical circuit. Although these techniques are useful, they may not identify errors or non-optimal design (in terms of best-practice guidelines that are being violated or not being upheld) that may relate to information from the datasheets, such as missing pull (up/down) resistors, communication protocols lines mismatch, exceeding operating conditions (such as voltage, current, temperature, etc.), violating direct connection instructions, incorrect components' placing and traces routing, etc.

Some of these types of faults may be partially checked by existing verification software tools, but said tools are extremely limited due to their lack of comprehensive access to datasheet information. Therefore, a review process conducted nowadays is heavily dependent on manual and un-automated design review procedures, and is thus slow (typically, nowadays a human inspection of an average circuit design takes a few weeks), cumbersome and prone to errors.

Furthermore, the ever-growing complexity of electrical circuits, driven by, among other factors, the minimization of electrical components size (for example, see "Moore's law" regarding the constant increase in number of transistors per silicon chip), makes human inspection to be unrealistic to complete thoroughly and accurately in a reasonable time.

The above-mentioned existing verification software tools rely on manual insertion of information from the datasheets of the electrical circuit's components. Examples of some such current technologies include:

1. Various "DRC" ("Design Rules Check") tools implemented in most of the PCB design CAD (computer-aid-design) software. These tools are capable of detecting a very narrow range of errors. For example, electrical schematic DRC tools are mostly capable of detecting errors that relate to connection of incompatible pin types (e.g., output-output connection) and extremely irregular connections (e.g. a net with fewer than two connections).

2. "Valydate Schematic Analysis" tool, implemented in Mentor Graphics' Xpedition package as per US patent publication U.S. Pat. No. 8,650,515B2 discloses systems and methods for validating a circuit design that include determining a subset of checks to apply to a portion of the overall circuit, based on the pin type composition of the circuit portion. The said disclosed "Valydate Schematic Analysis" tool is limited to inspection of the schematic files of the circuit and does not suggest the inspection or otherwise verification of the layout design. Furthermore, the "Valydate Schematic Analysis" tool's inspection technique is based on and limited to manual insertion of data from datasheets into pre-configured parametric models.

The above-mentioned verification tools do not address the problem of design errors/faults/violations of best-practice guidelines in electrical circuits, as evident from the fact that even when using these tools the industry still heavily relies on human manual design review and suffers from a high number of "re-spins" (as noted, the common name for iterations of design-layout-"Bring-Up" phase).

Therefore, there is a need in the art to provide a system and method for inspecting an electrical circuit design tool which is autonomous, extensive, comprehensive and capable of detecting in advance errors/faults/best-practice guidelines violations from a variety of abstraction/complexity levels in electrical circuit designs. More so, there is a need in the art to perform such operations in an efficient and timely manner, in a matter of minutes if not less.

Said limitations and drawbacks of the current art, and other limitations relating to limited range of detected errors, scalability, ease of use and stability warrant the invention suggested hereinbelow.

SUMMARY OF THE INVENTION

The following embodiments and aspects thereof are described and illustrated in conjunction with systems, devices and methods which are meant to be exemplary and illustrative and not limiting in scope. In various embodiments, one or more of the above-described problems have been reduced or eliminated, while other embodiments are directed to other advantages or improvements.

The current invention provides several substantial advantages some of which relate to the following:

Wider range of errors detected—automatic extraction can obtain many more pieces of data compared to a reasonable manual process. As a result, the current invention allows the detection of an unprecedented wide range of faults, from different complexity levels, compared to existing technologies.

Scalability—the present invention provides automatic extraction capabilities, which allows scalability in several dimensions, such as providing an ability to add new types of data to be examined, such as providing an ability to support new electrical components by extracting and converting their electrical documentation automatically, and such as providing an ability for a consistent update of data for an existing component. For example, if a manufacturer of a certain component issues an electrical documentation update/amendment, it may be seamlessly uploaded in order to provide an up-to-date electrical circuit schematic and layout inspection system. In contrast, any of these operations is extremely difficult and expensive when using the existing manual-insertion-based technologies.

Ease of use—the present invention provides an electrical circuit design inspection system and method that provides schematic and layout inspection capabilities which enable an autonomous extraction of data (apart from some particular exceptions to be discuss hereinafter). As a result, the user is not required to perform complicated insertions of large amounts of data (as is sometimes required in existing solution) and can simply use a friendly interface, such as a drag-and-drop interface, etc. in which to upload the electrical design data such as Netlist, Gerber files, BOM, or any other relevant data.

Stability—by avoiding manual operations, the present invention may be immune to the risk of "human-errors", which may affect known existing technologies.

According to one aspect, there is provided a method for using an Artificial Intelligence (AI) based method for electrical design inspection, comprising the steps of: step (i); extracting data from at least one electrical documentation associated with at least one electrical component, such component being part of an electrical circuit represented in at least one electrical design representation, step (ii); extracting supplementary data concerning the electrical circuit and additional user defined rules selected for the inspection, step (iii); converting the data extracted in step (i) to a formal language, step (iv); performing a design verification process by utilizing the data received in step (ii) and the converted data generated in step (iii), step (v); producing an inspection results output, wherein steps (i), (iii)-(v) are configured to be conducted autonomous manner, wherein the data conversion in step (iii) is configured to be conducted in an autonomous manner by utilizing an AI model along with deterministic algorithms, and wherein the inspection results output is configured to specify various analysis findings concerning the electrical circuit represented in the at least one electrical design.

According to some embodiments, the data analysis in step (iv) is further configured to be conducted by an AI model.

According to some embodiments, the data analysis in step (iv) is further configured to be conducted by deterministic algorithms based on electrical circuit theory.

According to some embodiments, the electrical circuit is a Printed Circuit Board (PCB)/a silicon-based chip.

According to some embodiments, the supplementary electrical design data comprising Netlist files describing the electrical circuit schematic characteristics.

According to some embodiments, the supplementary electrical design data comprising Gerber files describing the electrical circuit layout characteristics.

According to some embodiments, the supplementary electrical design data comprising data regarding Bill of Materials (BOM).

According to some embodiments, the selected user defined rules comprising data regarding at least one user-defined rule configured to be offered and selected during the electrical design inspection process.

According to some embodiments, the user is able to select at least one, or alternatively, no user-defined rule to be enforced during the electrical design inspection process.

According to some embodiments, the at least one user-defined rule is supplementary to a pre-defined global list of rules configured to be enforced during the electrical design inspection process.

According to some embodiments, the pre-defined global list of rules is configured to be edited or amended in any way by the user.

According to some embodiments, violations of the user-defined rules are specified in the inspection results output.

According to some embodiments, the data conversion in step (iii) is configured to be conducted by an AI model, which is configured to analyze data written in a natural language and translate it to a standard formal language.

According to some embodiments, the AI model is a text parsing and NLP model trained to extract and analyze relevant data.

According to some embodiments, the AI model is an image processing and computer vision model trained to extract and analyze relevant data.

According to some embodiments, the autonomous extraction of electrical documentation enables an autonomous update of the formal language used by the system whenever said electrical documentation is updated by its creator.

According to some embodiments, the electrical design inspection method further enables a user to manually insert non-public documentation and/or supplementary electrical design data.

According to some embodiments, the inspection results output is configured to specify design violations of at least one manufacturer's instruction.

According to some embodiments, at least one instruction may be determined from a specific textual data or a graphic representation designated to demonstrate a requirement for proper use of the component in the electrical design.

According to some embodiments, the inspection results output is configured to specify design errors that result from incorrect connections between components.

According to some embodiments, the inspection results output is configured to specify logical design errors by combining the properties of relevant components and applying electrical circuit theory laws.

According to some embodiments, the inspection results output is configured to specify overcurrent/overvoltage/overpower on any given pin/component in the electrical circuit.

According to some embodiments, the current/voltage/power values are calculated by automatically extracting and utilizing at least one formula that calculates current/voltage/power outputs specified in at least one electrical documentation of at least one electrical component in the electrical circuit, compare it with actual connections in the electrical design representation and determining the actual current/voltage/power output.

According to some embodiments, the inspection results output is configured to specify violated timing constraints.

According to some embodiments, the inspection results output is configured to specify a list of warnings and/or best practices recommendations, based either on global rules or on selected user-defined rules.

According to some embodiments, the inspection results output is configured to specify mismatch in footprint regarding any component in the electrical circuit.

According to some embodiments, wherein the inspection results output is a report depicting various faults as a textual representation.

According to some embodiments, the inspection results output is an illustrative report depicting various faults as a visual representation.

According to some embodiments, the inspection results output further exhibit visual guidelines representing possible corrections to said various faults.

According to some embodiments, the inspection results output is configured to specify any violation of at least one instruction by which to connect a component's pins.

According to some embodiments, the inspection results output is configured to specify any violation of at least one instruction by which to connect a component's thermal/exposed pad.

According to some embodiments, the inspection results output is configured to specify any missing required pull-up/pull-down resistor, wherein the specification may be derived from a net/line function as part of a known communication protocol or derived from an instruction appears in at least one electrical documentation of at least one of the electrical components connected to that net/line.

According to some embodiments, the electrical design inspection method is configured to specify any mix-up of lines according to known communication protocols, wherein a communication protocol and the individual pin roles are determined by the relevant components' documentation.

According to some embodiments, the electrical design inspection method is configured to specify any erroneous connection between IO pins of components with incompatible logical levels, wherein the logical levels are determined by the relevant components' documentation.

According to some embodiments, the electrical design inspection method is configured to specify any parameter that exceeds its absolute maximum ratings/recommended operating conditions limits, wherein the conditions limits are determined by the relevant components' documentation.

According to some embodiments, the electrical design inspection method is configured to specify collisions between I2C bus addresses, wherein the bus address of each component is determined by its electrical documentation.

According to some embodiments, the electrical design inspection method is configured to specify any erroneous input voltage for a voltage regulator which prevents it from supplying a correct output voltage.

According to some embodiments, the electrical design inspection method is configured to specify any utilization of a component forming part of the electrical circuit which does not uphold known standards, wherein the specific standards to inspect are selected by the user via the user defined rules in the supplementary data.

According to some embodiments, the electrical design inspection method is configured to present statistical data and analysis regarding the properties of at least one component forming a part of the electrical circuit represented in the electrical design.

According to some embodiments, wherein the statistical data and analysis regards thermal properties/geometrical properties.

According to some embodiments, the electrical design inspection method is configured to specify an erroneous placement of a component over a ground plane in contradiction with a relevant components' documentation.

According to a second aspect, there is provided a system for electrical design inspection, comprising: extraction data means for extracting data from at least one electrical documentation associated with at least one electrical component, such component being part of an electrical circuit represented in at least one electrical design representation; supplementary data sources wherefrom supplementary data concerning the electrical circuit and additional user defined rules selected for the inspection are extractible; conversion means whereby the data extracted by said data extraction means from at least one electrical documentation is convertible to a formal language; a controller coupled with said data extraction and conversion means that autonomously operating a design verification process by utilizing the converted and gathered data and outputting inspection results while employing AI models along with deterministic algorithms

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

In the Figures.

DETAILED DESCRIPTION OF SOME EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

The term "Controller", as used herein, refers to any type of computing platform that may be provisioned with a memory device, a Central Processing Unit (CPU) or microprocessors, and several input/output (I/O) ports, for example, a general-purpose computer such as a personal computer, laptop, tablet, mobile cellular phone or a cloud computing system.

The term "Electrical documentation" as used herein, refers to any data relating to an electrical circuit representation, such as electrical datasheets, reference design, application notes, etc., that is not written in a uniform data format such as a formal language.

The term "Electrical design data" as used herein, refers to any kind of electrical circuit representation, either numeral, textual or graphic, such as a circuit diagram, an electrical diagram, an elementary diagram, an electrical schematic such as Netlist, an electrical layout such as Gerber files, BOM, etc. that is written in a uniform data format.

The term "Datasheets" as used herein, refers to any written documentation provided by the company manufacturing the electrical component, which contains information regarding its properties and requirements. This may include but not limited to the documents with the following common names: "Datasheet", "Reference Design", "Application Notes", "Errata", "User Manual", "User Guidelines", etc. Datasheets may be written in a variety of formats such as PDF, TXT, DIC, etc.

The term "Netlist" as used herein, refers to a final output generated from an electrical schematic and discloses the connectivity of an electrical circuit. A Netlist mat be exported from any schematics design CAD software (for example: OrCAD, Altium, etc.). a Netlist may comprise a plurality of nets, each of which indicates electrical components, or more particularly ports, or pins, of components, that are connected together. Each electrical component specified in a netlist may be identified by a reference, and the specific electrical component associated with said reference may be specified separately, typically by a Bill of Materials (BOM).

The term "Layout", as used herein, refers to the entire geometry and topology of the circuit. For example, layout files such as Gerber files may disclose the geometrical bearings of electrical components embedded within or placed upon an electrical circuit, as well as the physical characteristics of the electrical circuit itself.

The term "BOM" (Bill of Materials) as used herein, refers to comprehensive inventory of the raw materials, assemblies, subassemblies, parts and components, as well as the quantities of each, needed to manufacture a product.

The terms "net" as used herein, refers to a group of pins that are connected (shortened) to one another.

The terms "line" as used herein, refers to a group of nets that are connected to one another with serial resistors.

The terms "logical levels" as used herein, refers to voltage ranges which are considered for purposes of digital communication/control as "HIGH" (also known as "1") and "LOW" (also known as "0").

The term "User defined rules" as used herein, refers to any sort of input from the user in which it is selected desired rules to enforce or verify in the electrical design. A User defined rule may be optional and/or additional pre-defined rules to be enforced in the design inspection phase by the design verification unit. (disclosed in FIG. 1's description). User defined rules may be added in addition to the global rules, also designated to be enforced by the design verification unit.

The term "Natural language" as used herein, refers to any form of un-standardized data, whether unstructured, semi-structured or fully-structured, representation such as spoken language, natural graphs/diagrams/schematics, etc. The term "Formal language" as used herein, refers to unique uniform language used to standardize information regarding electrical components.

The current invention uses automatic extraction of data from the electrical documentation such as datasheets etc., and yields several utilizations, for example:

Early detection of errors in the electrical design, leading to a reduction of the required number of "re-spins", which in turn yields shorter R&D cycles, shorter "Time to Market" and lower costs (in terms of both labor hours and materials).

Low risk of errors making their way to the final product.

"Healthy" and predictable design process, in which there is significantly less need for manual operations and inspections.

Enforcements of best-practice guidelines and/or user-defined rules that improves the quality of the design.

According to some embodiments, an electrical circuit design inspection system may be any controller operated by a software configured to provide an automated inspection tool allowing a designer to detect a variety of faults, from relatively minor to major and from direct to complex and implicit design violations, wherein said inspection is configured to be applied following the stage of electrical schematics preparation/design of an electrical circuit, hence, providing an early inspection system able to thoroughly inspect the electrical schematic and layout of an electrical circuit before creating a physical prototype and without the need to proceed all the way to the "Bring-Up" phase.

According to some embodiments, the electrical circuit design inspection system and method may enable a user to insert electrical design data, such as Netlist, Gerber files, BOM, etc., as well as optional user defined rules. It also may enable a user to insert non-public electrical documentation, such as disclosed datasheets.

According to some embodiments, the electrical design data and/or the non-public documentation may be inserted using a convenient user interface (UI) such as a drag-and-drop UI.

According to some embodiments, the electrical design data and/or the non-public documentation may be partially autonomously extracted. For example, said data may be extracted from one or more folder, server, datacenter, etc. by allowing the user to manually insert a path to a certain data location and the rest of the inspection process may continue autonomously.

According to some embodiments, the user may be requested to manually sign into the electrical circuit design inspection system, next the user may be requested to choose desired user defined rules, etc. from a list, or manually edit or adjust a requested user-defined rule. Next, the user may use a drag-and-drop UI to enter the requested electrical design data and supplementary/non-public electrical documentation data to the electrical circuit design inspection system. Next, the user may order the electrical circuit design inspection system to analyze the inserted electrical design data and wait for results. Next, the user may choose to show or download a report generated based on said results.

Figure 1A:
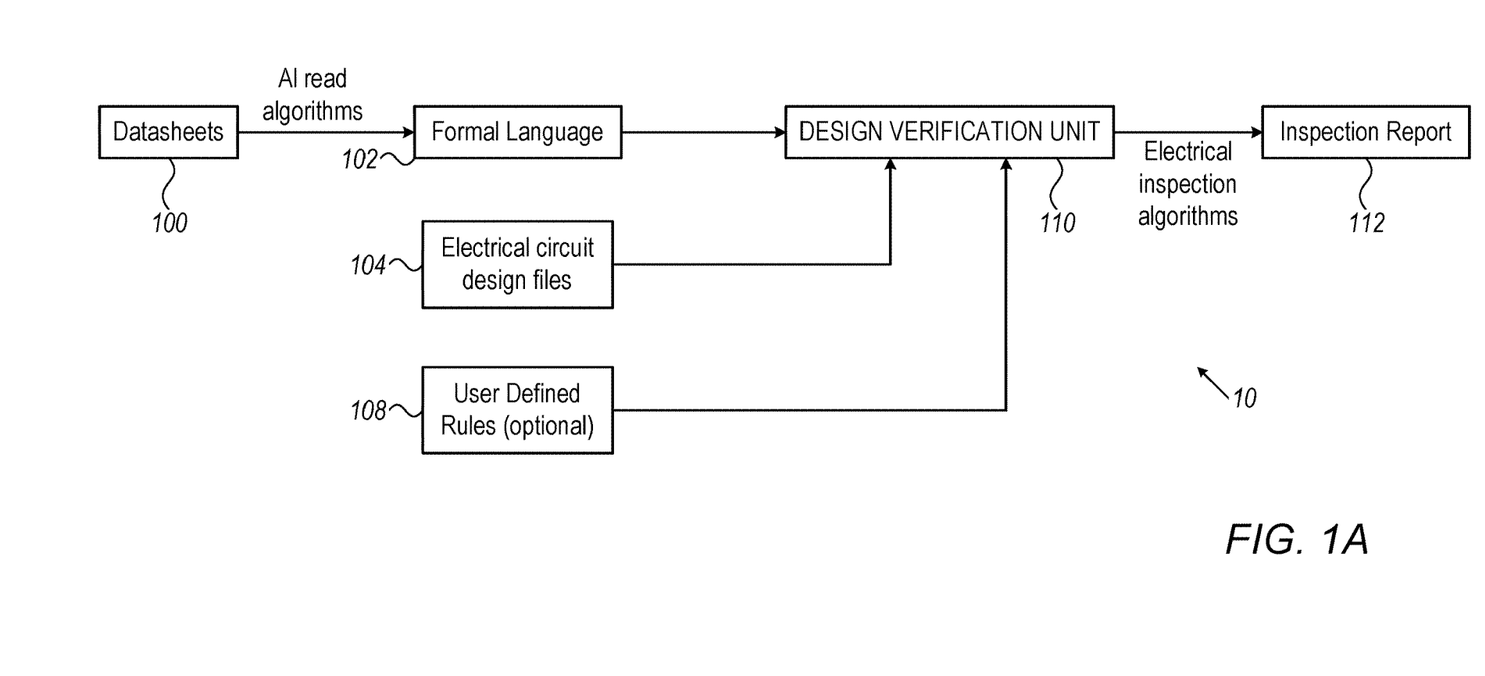
FIG. 1A constitutes a flowchart diagram illustrating the operation of an electrical circuit schematic and layout inspection system and method, according to some embodiments of the invention.

Reference is now made to FIG. 1 which schematically illustrates a flowchart diagram of the operation of an electrical circuit design inspection system and method 10 of the present invention. As shown, in operation 100, a parsing algorithm such as a proprietary AI based text parsing and/or computer vision algorithms may convert the electrical documentations such as datasheets, etc., to a formal language as per operation 102.

According to some embodiments, each relevant information item in the electrical documentation that presents properties and requirements of the component may be inferred using:

Black-box machine learning (ML) algorithms, such as text parsing and NLP algorithms and models for textual information items, and computer vision algorithms and models such as NN, CNN, RNN, or other AI models for graphical information items.

According to some embodiments, said ML algorithms or AI models may learn and improve by training them on a mass of information items from different electrical documentation.

Deterministic algorithms that are based on electrical circuit theory and domain knowledge.

Tailor-made algorithms that combine ML and deterministic algorithms by adjusting ML algorithms or AI models to the specific realm of the problem, i.e. to the electrical circuit theory language (including special phrases, symbols, etc.), rules, special properties, laws, etc.

According to some embodiments, the data designated to be extracted and analyzed by the AI parsing algorithm may contain several properties of an electrical component forming an electrical circuit. In addition to an electrical circuit schematic and layout inspection, some of the parsed properties may be mechanical, for example: physical dimensions of the component, mechanical stress ranges, etc., and some of the parsed properties may be thermal, for example: heat profile, thermal resistance, etc.

According to some embodiments, these various properties may be used for other kinds of inspections, for example: mechanical inspection, thermal inspection, computer aided engineering inspection, etc., provided that such supplementary data contains the relevant information for that kind of inspection, for example: DXF files for mechanical inspection, etc.

According to some embodiments, electrical documentations such as datasheets, etc. disclose at least one electrical component forming part of an electrical circuit represented in at least one electrical design representation (electrical schematics).

According to some embodiments, datasheets may be written in a variety of forms such as natural language, graphs, diagrams, schematics etc. and hence, an automated inspection system may be incapable to process and assess a typical datasheet, all the more so to produce recommendations/corrections regarding its integrity. An AI parsing algorithm may be configured to convert any data used to write an inspected datasheet to a formal and standard language, allowing a unified analysis and inspection.

According to some embodiments, the parsing algorithm may be configured to extract data from public electrical documentation available online. In operations 104 and 108, the electrical circuit design inspection system 10 is configured to analyze the electrical circuit design files, the BOM and optional user defined rules.

According to some embodiments, the electrical circuit design files may comprise a Netlist which may be exported from any schematics design software such as CAD (PADS, OrCAD, Altium, etc.) etc. According to some embodiments, the parsing algorithm may be configured to extract and analyze data from the Bill of Materials (BOM) which is a list of all components meant to be assembled on an electrical circuit and includes exact identification of each component and its location in the electrical circuit. According to some embodiments, the parsing algorithm may be configured to extract and analyze data from any other document or data source or an optional user defined rules related to the electrical documentations of an electrical circuits be assessed.

According to some embodiments, the data designated to be extracted and analyzed by the AI parsing algorithm may contain several properties of an electrical component forming an electrical circuit. Hence, the data may contain a property data such a "forward voltage drop of 1V", etc. and properties such the requirements about the proper way to use it, for example, "connect pin number 3 to the GND with a 0.1 uF capacitor in parallel", etc. According to some embodiments, said data disclosed above, which was originally written in unstandardized language such as natural language, is designated to be translated and converted into a proprietary uniform Formal Language (operation 102), allowing standardization of said data.

According to some embodiments, a user may upload the electrical circuit design files and BOM (operation 104) to a design verification unit (DVU) (operation 110) configured to perform a design verification process in order to detect and verify any aspect of the electrical circuit design using a user interface IU, for example, a drag-and-drop interface, etc.

According to some embodiments, the user may also define additional rules (operation 108) configured to be enforced in the design inspection phase by the DVU. According to some embodiments, the user defined additional rules are not included in the pre-defined global list of rules enforced and inspected already by the DVU.

According to some embodiments, the DVU is configured to receive data from the electrical design data files such as Netlist, BOM and from the optional additional rules set by the user (depicted on operations 104 and 108), and in particular, receive data regarding the components comprising the electrical circuit and represented in the electrical documentations such as datasheets, which is translated and converted to a formal language, (depicted on 100 and 102) along with the information on the way said components are actually used in the schematics (as seen in operation 104). The DVU may then run electrical inspection algorithm, for example, an electrical inspection algorithm based on electrical circuit theory, etc., and may check for violations of global electrical/physical rules, and optionally, violation of user-defined rules (depicted on operation 108).

According to some embodiments, the DVU may them generate an inspection report (depicted on operation 112), which may contain lists of errors, warnings, best-practice guidelines violations or any other indication based on the process of design inspection carried by DVU. According to some embodiments, the inspection report may comprise visual guidelines for correcting detected faults or any other findings. According to some embodiments, along with the user-defined rules, the inspection report generated by the DVU may further address optional best-practice guidelines learnt from various users through time.

According to some embodiments, the DVU (depicted in step 110) may detect and verify any aspect of an electrical circuit design. For example, the DVU may identify wrong, invalid or out-of-range input to a component, violation of direct instructions from the electrical documentations such as datasheets, etc. any mismatch in communication lines, overcurrent, overvoltage or overpower or connections' instructions violations on any given pin/component, violated timing constraints, etc.

According to some embodiments, the current/voltage/power values are calculated by autonomously extracting and utilizing at least one formula that calculates current/voltage/power outputs specified in an electrical documentation of the electrical component in the electrical circuit, compare it with actual connections in the electrical design representation and determining the actual current/voltage/power output.

According to some embodiments, a report depicted in step 112, may be provided by DVU and may indicate or highlight any aspect of an electrical circuit design as disclosed above. For example, the report produced by the DVU may present a visual representation of an electrical circuit (such as a PCBs, circuits comprising silicon-based chips, or any other types of electrical circuitry) and its components and may add indicators (e.g., colored arrows) or animated demonstration that point to locations where an error or violation or any other fault or recommendation was found (e.g., an input port receiving wrong voltage, a path that violates timing and etc.).

Figure 1B:
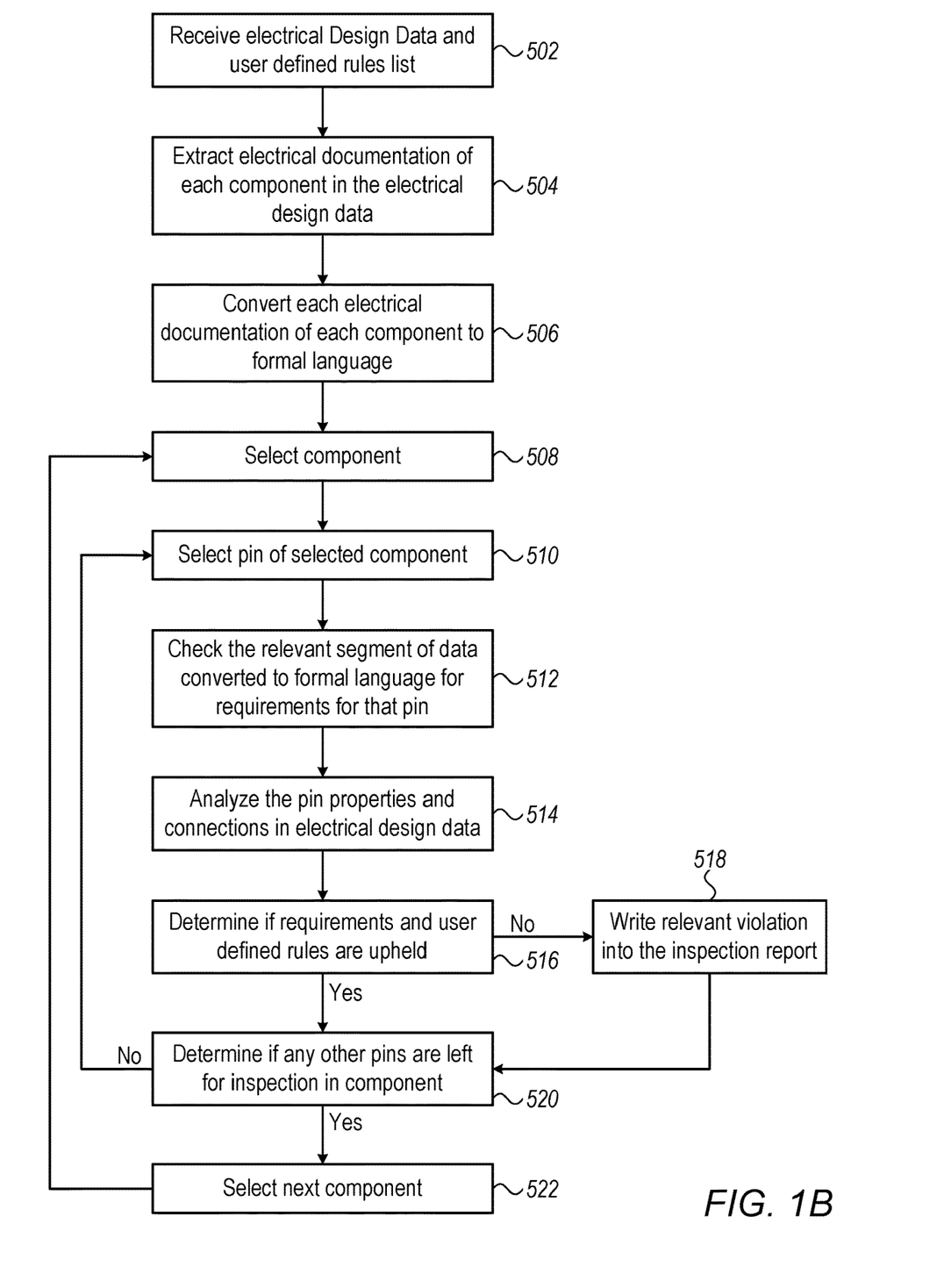
FIG. 1B constitutes a flowchart diagram illustrating more detailed flow of an electrical circuit schematic and layout inspection system, according to some embodiments of the invention.

Reference is now made to FIG. 1B which schematically illustrates a flowchart diagram illustrating more detailed flow of an electrical circuit schematic and layout inspection system, according to some embodiments of the invention. As shown, in operation 502, the electrical circuit design inspection system and method 10 is configured to receive electrical design data and user defined rules. In operation 504, electrical documentation of each component in the electrical design data is being extracted. In operation 506, each electrical documentation of each component is converted to a formal language. In operation 508, a component is being selected. In operation 510, a pin forming a part of the selected component is being selected. According to some embodiments, operation 510 may be optional, since the electrical circuit design inspection system and method 10 may perform an inspection at the component level and not at the pin level. In operation 512, the relevant segment of data converted to formal language is being checked for requirements for that pin. Alternatively, and according to some embodiments, the relevant segment of data converted to formal language may be checked for requirements of the whole component. In operation 514, the pin properties and connections in the electrical design data are being analyzed. Alternatively, and according to some embodiments, the component' properties and connections in the electrical design data may be analyzed. In operation 516, the electrical circuit design inspection system and method 10 may determine if requirements and user defined rules are upheld. If no, in operation 518, relevant violation may be written into inspection report. If yes, in operation 520, the electrical circuit design inspection system and method 10 may determine if any other pins are left for inspection in the component. If no, operation 510 may be repeated. If yes, the electrical circuit design inspection system and method 10 may select the next component to be inspect by repeating operation 508.

Figure 2:
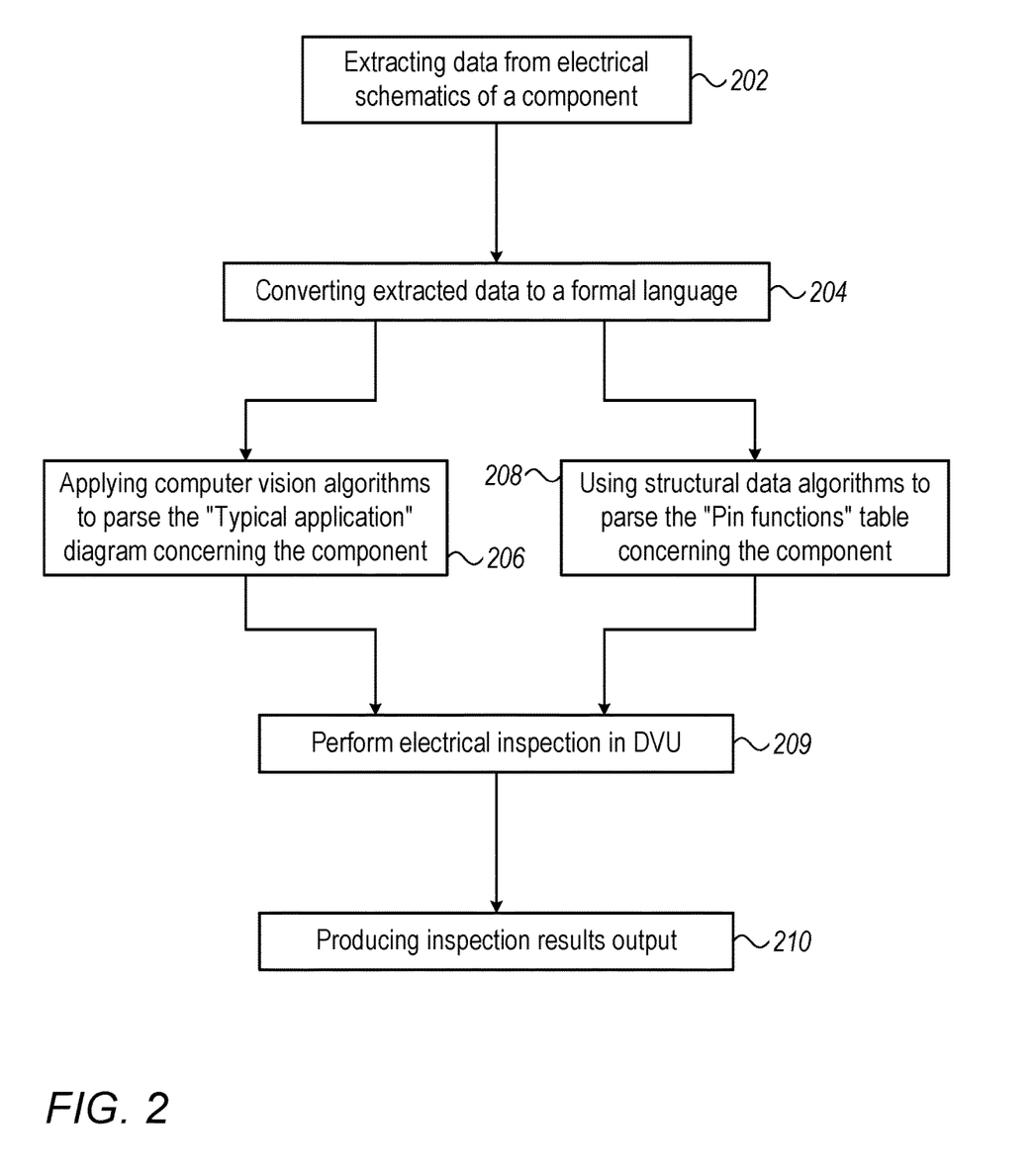
FIG. 2 constitutes a schematic illustration of a general flowchart of the possible steps needed for examination of an electrical circuit schematic.
Figure 3:
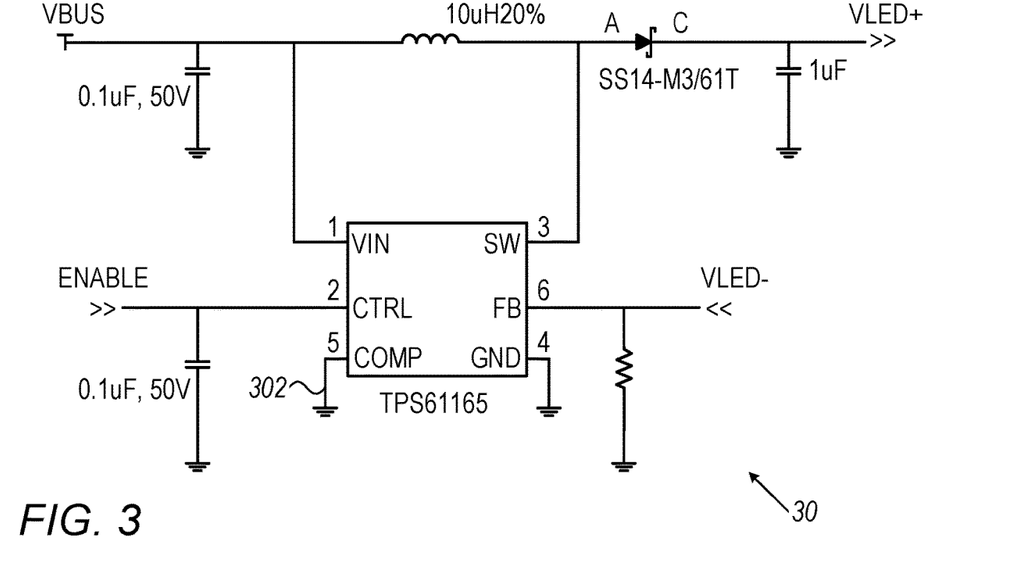
FIG. 3 constitutes a small segment of an electrical circuit schematic that uses a typical component named TPS61165, produced by Texas Instruments (TI), as appears in a typical CAD software as may be examined by the electrical circuit design inspection system and method of the present invention.
Figure 4:
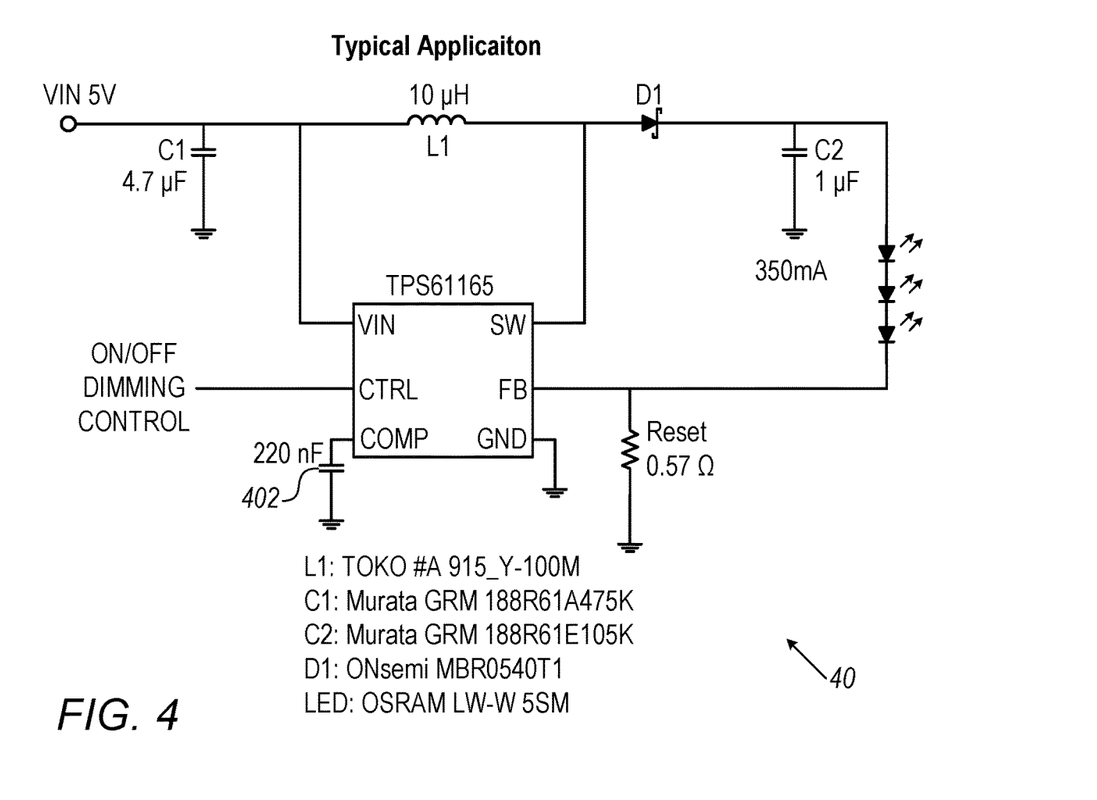
FIG. 4 constitutes a visual "Typical Application" diagram that typically appears in a TPS61165 datasheet and demonstrates its requirements.
Figure 5:
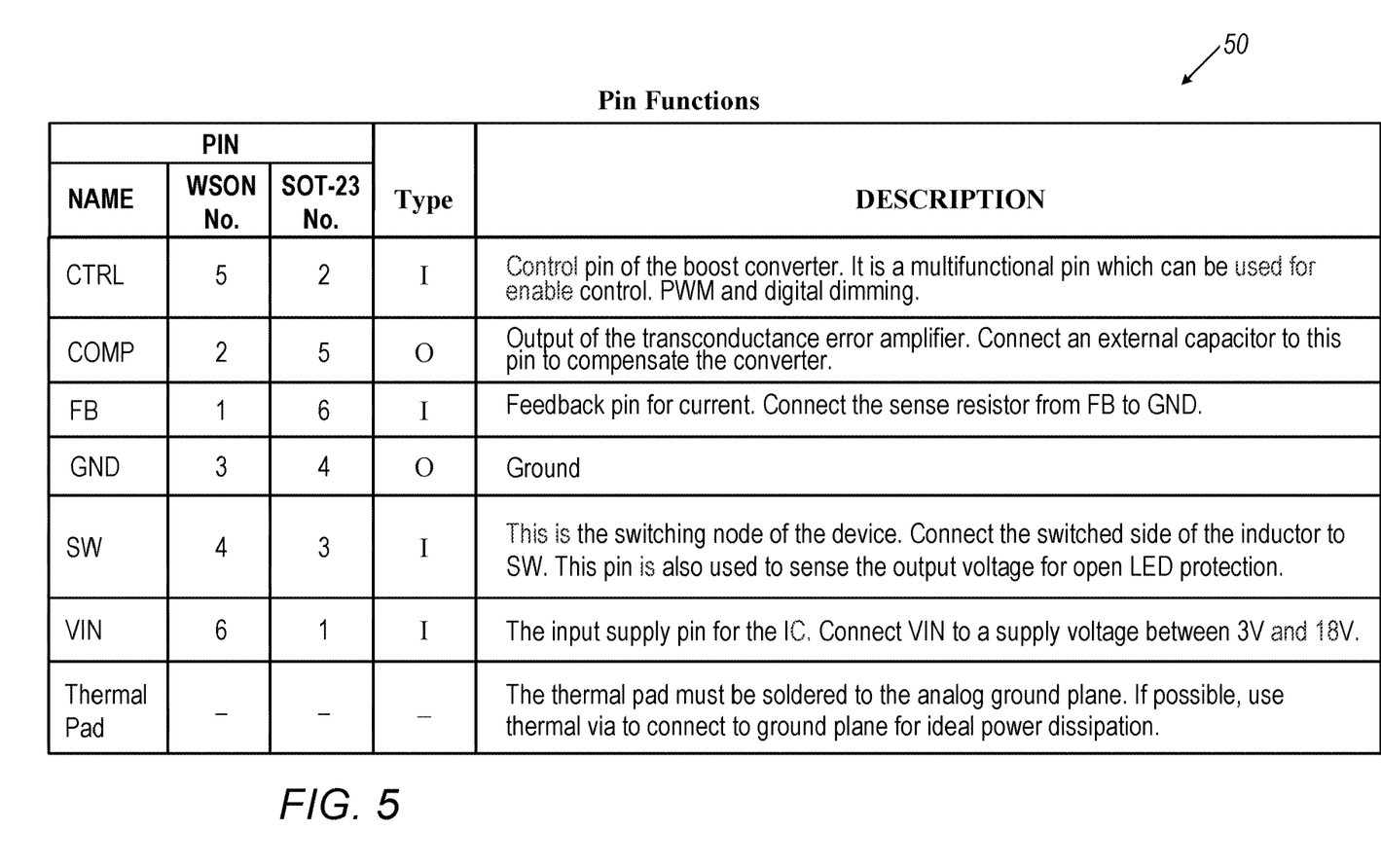
FIG. 5 constitutes a textual "Pin Functions" table that typically appears in a TPS61165 datasheet and instructs how to connect each of the TPS61165 pins in a proper way.

Reference is now made to FIG. 2 which schematically illustrates a general flowchart of the possible steps needed for examination of electrical circuit schematic 20, further depicted in FIG. 3-FIG. 5.

According to some embodiments, the connections of said small segment of the electrical circuit schematic can be translated to a textual form in a Netlist representation. According to some embodiments, said small segment of an electrical circuit schematic represents the schematic inspection capabilities of the electrical design inspection system 10 and disclosing a simple component, one error and two pieces of information.

Reference is further made to FIG. 3 which schematically illustrates a small segment of an electrical circuit schematic 30 that uses a component named TPS61165, by Texas Instruments (TI) as appears in a typical CAD software and may be examined by the electrical circuit design inspection system 10 of the present invention.

Reference is also made to FIG. 4, which schematically illustrates a "Typical Application" diagram 40 that appears in TPS61165 datasheet and demonstrate some of its requirements, including the proper way to connect it.

Reference is also made to FIG. 5, which schematically illustrates a textual "Pin Functions" table 50 that appears in TPS61165 datasheet and instructs how to connect each of its pins properly.

According to some embodiments, said example may be duplicated and enhanced to other kind of components, errors (or warning/best practices guidelines violations), pieces of information, both for the schematic aspect and the layout aspect of the examined electrical circuit.

According to some embodiments, in step 202, data is extracted from an electrical documentation such as electrical schematics, for example, data may be extracted from electrical schematic 30 representing an electrical component, named TPS61165. According to some embodiments, in step 204, the data extracted from the electrical schematics in step 202 is being converted from any type of language to a formal language as detailed in the disclosure concerning FIG. 1. According to some embodiments, in step 206 computer vision algorithms may be applied to parse a "typical application" diagram concerning the TPS61165 component in order to provide a reliable reference to correct schematics of said component. According to some embodiments, in step 208 structural data algorithms may be applied to parse a "pin functions" table concerning the TPS61165 component in order to provide a reliable reference to correct connection instructions of said component. According to some embodiments, in step 210 an inspection results output may be produced.

According to some embodiments, an electrical component, named TPS61165 is represented in an electrical schematic 30, wherein one of TPS61165 pins (the pin named COMP 302) is connected directly ("shortened") to Ground. However, according to TPS61165 datasheet 40, COMP 302 should be connected to Ground via a capacitor 402 shown in a typical application diagram depicted in FIG. 4. As can be seen in FIG. 3, a capacitor was not connected as required to COMP 302, representing a connection error.

According to some embodiments, the electrical circuit design inspection system 10 may detect such error by either:
  a. Parsing the "Typical Application" diagram 40 shown on FIG. 4 using computer vision algorithms that are capable of detecting known electrical symbols such as capacitor, ground, wire, etc., and inferring from it the required connections.
  b. Parsing the "Pin Functions" table 50 shown in FIG. 5 using structural data parsing algorithms that are capable of detecting the relevant row for COMP 302 pin, the relevant columns for its properties, and then applying text parsing and NLP algorithms to infer the connection requirement for this pin.

According to some embodiments, the inspection process disclosed above may achieve several goals, for example, the Electrical circuit design inspection system 10 may enable an Immediate detection of design violations of manufacturer's instructions, as appear in the electrical documentations such as datasheets, etc. of the electrical components forming an electrical circuit.

According to some embodiments, the manufacturer's instructions may be specific textual data or a graphic representation, appearing in the documentation and demonstrating a requirement for proper use of the component in an electrical design.

According to some embodiments, the Electrical circuit design inspection system 10 may provide an immediate detection of design errors that result from incorrect/faulty connections between components, based on the requirements extracted from their electrical documentations such as datasheets, etc.

According to some embodiments, the electrical circuit design inspection system 10 may provide an Immediate detection of logical design errors. For example, the Electrical circuit design inspection system 10 may combine the properties of all relevant components forming an electrical circuit as extracted from their electrical documentations such as datasheets, etc. and use this data to apply circuit theory laws.

According to some embodiments, the Electrical circuit design inspection system 10 may provide immediate detection means with regard to violations of the user-defined rules.

According to some embodiments, the Electrical circuit design inspection system 10 may further provide immediate production of warnings list and best-practice guidelines violations, based either on known global rules or on rules that were learnt from users through time.

According to some embodiments, the Electrical circuit design inspection system 10 may be configured to detect and specify electrical layout field errors/faults/best-practice guidelines violations related to an examined PCB. For example, the Electrical circuit design inspection system 10 may have an ability to detect and specify errors/faults/best-practice guidelines violations related to the suggested placement of components and connections (routs), geometrically, on the actual physical board, wherein said data may be extracted from datasheet/s representing said examined electrical circuit.

According to some embodiments, the Electrical circuit design inspection system 10 may provide an ability to detect and specify various violations regarding a direct/indirect connection instruction of pin/s forming a part of a component. For example, the Electrical circuit design inspection system 10 may detect and specify a required connection to ground/power other pin/s of the component, and wherein the detectable violation may be conducted either directly or via another component, for example, by another component operating as a resistor/capacitor/inductor/diode/transistor, etc.

According to some embodiments, a connection instruction may be determined/extracted from either a specific textual instruction or from any kind of graphic representation (such as a drawing, scheme, graph, etc.) demonstrating a typical/required connection and disclosed in the relevant component's datasheet.

According to some embodiments, a connection instruction may provide instruction for more than one pin and/or may provide instruction for more than one target connection and/or may provide instruction for connections of more than one intermediate component forming an electrical circuit 10.

According to some embodiments, the Electrical circuit design inspection system 10 may be configured to detect and specify any violation of instructions by which to connect a component's thermal/exposed pad, whereas the instruction may be determined from a specific textual instruction or from any kind of graphic representation (such as a drawing, scheme, graph, etc.) demonstrating a typical/required connection in the relevant component's datasheet.

According to some embodiments, the Electrical circuit design inspection system 10 may be configured to detect and pin-point any missing required pull-up/pull-down resistor on a net or on a line in an electrical circuit forming a part of a PCB. According to some embodiments, a missing required pull-up/pull-down resistor may be derived from either:
   a. The function of the net or line as part of a communication protocol in accordance to the specification described in a datasheet that represents a component connected to that net or line.
   b. An instruction in one of the electrical documentations such as datasheets, etc. describing a component connected to that net/line.

According to some embodiments, the Electrical circuit design inspection system 10 may be configured to detect and specify any mix-up of lines according to known communication protocols (e.g. SCL pin connected to SDA pin in I2C protocol). For example, the Electrical circuit design inspection system 10 may be configured to specify mix-up of lines according to I2C, RS232, USB, SPI, I2S, RS485, Ethernet, etc. According to some embodiments, the Electrical circuit design inspection system 10 may be configured to specify any mix-up of lines in accordance to any connection of pins with incompatible roles according to a certain communication protocol, according to some embodiments, a communication protocol and the individual pin roles used to specify any nix-up of lines are determined by a relevant components' electrical documentations such as datasheets, etc.

According to some embodiments, the Electrical circuit design inspection system 10 may be configured to detect and specify any erroneous or faulty connection between input/output (IO) pins of components with incompatible logical levels (VOH, VIH, VOL, VIL) which are determined by the datasheet of the relevant component.

According to some embodiments, the Electrical circuit design inspection system 10 may be configured to detect and specify any parameter, such as supply/IO input voltage, erroneous connections between IO pins of components; for example, erroneous connections between IO pins with incompatible logical levels, etc., free-air/junction temperature, sink/source current, electrostatic discharge, etc., that exceeds its absolute maximum ratings/recommended operating conditions limits according to the relevant textual/mathematical/graphical data in the components' electrical documentations such as datasheets, etc. According to some embodiments, said absolute maximum ratings/recommended operating conditions limits may be determined with regard to their dependency on certain analytical formulas, graphs or any other representation in the component's electrical documentations such as datasheets, etc. and in further dependency on other parameters or conditions (For example, ambient temperature, etc.) that may be supplied by the user in the supplementary material relating to a component forming an electrical circuit.

According to some embodiments, the Electrical circuit design inspection system 10 may be configured to detect and specify any utilization of a component in the electrical circuit of a PCB, which does not uphold, according to its datasheet, known standards (such as ROHS, Military/Automotive/Industrial Grading, etc.). According to some embodiments, said standards may be defined as necessary by the user in the supplementary data relating to said component.

According to some embodiments, the Electrical circuit design inspection system 10 may be configured to detect and specify collisions between I2C bus addresses. In other words, a circuit that contains an I2C bus in which more than one component has the same slave address, may be specified and detected using the Electrical circuit design inspection system 10. According to some embodiments, the address of each slave component forming an electrical circuit may be determined by a direct property in the component's datasheet. According to some embodiments, the address of each slave component forming an electrical circuit may be derived and calculated from the relevant formula in the component's datasheet, wherein said address derivation and calculation of each slave component forming an electrical circuit, is based on the connection of its address-related pins.

According to some embodiments, the electrical circuit design inspection system 10 may be configured to detect and specify any erroneous or faulty input voltage for a voltage regulator, [that may be a fixed/adjustable Low Dropout (LDO)], wherein said erroneous or faulty input voltage mat prevent said voltage regulator from supplying the correct output voltage, as disclosed above. For example: fixed LDO in which the supply voltage (Vin) is smaller than the sum of the expected output voltage (Vout) and the dropout voltage (Vdropout) may be detected and specified by the electrical circuit design inspection system 10.

According to some embodiments, the electrical circuit design inspection system 10 may be configured to present statistical data and analysis regarding the geometric properties (such as height, width, etc.) or thermal properties of the components utilized in the circuit as part of a PCB. According to some embodiments, these properties may be determined from a textual or a graphical description disclosed or depicted in the relevant component's datasheet which relates to the relevant footprint (component's packaging such as JEDEC package, etc.) used in the circuit.

According to some embodiments, the electrical circuit design inspection system 10 may be configured to specify an erroneous or a faulty placement of a component (such as an antenna) on a ground plane of a PBC, in contradiction to an instruction specified in said component' datasheet.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. An Artificial Intelligence (AI) based method for electrical design inspection, comprising the steps of:
   (i) extracting data from at least one electrical documentation associated with at least one electrical component, such component being part of an electrical circuit represented in at least one electrical design representation,
   (ii) extracting supplementary data concerning the electrical circuit and additional user defined rules selected for the inspection,
   (iii) converting the data extracted in step (i) to a formal language,
   (iv) performing a design verification process by utilizing the data received in step (ii) and the converted data generated in step (iii), and
   (v) producing an inspection results output,
   wherein steps (i), (iii)-(v) are configured to be conducted in autonomous manner,
   wherein the data conversion in step (iii) is configured to be conducted in an autonomous manner by utilizing an AI model along with deterministic algorithms, and wherein the inspection results output is configured to specify various analysis findings concerning the electrical circuit represented in the at least one electrical design, wherein the data conversion in step (iii) is configured to be conducted by an AI model, which is configured to analyze data written in a natural language and translate it to a standard formal language.

2. The method of claim 1, wherein the selected user defined rules comprising data regarding at least one user-defined rule configured to be offered and selected during the electrical design inspection process, wherein the user is able to select at least one, or alternatively, no user-defined rule to be enforced during the electrical design inspection process and wherein the at least one user-defined rule is supplementary to a pre-defined global list of rules configured to be enforced during the electrical design inspection process.

3. The method of claim 1, wherein the autonomous extraction of electrical documentation enables an autonomous update of the formal language used by the system whenever said electrical documentation is updated by its creator.

4. The method of claim 1, wherein the electrical design inspection method further enables a user to insert non-public documentation and/or supplementary electrical design data.

5. The method of claim 1, wherein the inspection results output is configured to specify design violations of at least one manufacturer's instruction and wherein at least one instruction may be determined from a specific textual data or a graphic representation designated to demonstrate a requirement for proper use of the component in the electrical design.

6. The method of claim 1, wherein the inspection results output is configured to specify logical design errors by combining the properties of relevant components and applying electrical circuit theory laws.

7. The method of claim 1, wherein the inspection results output is configured to specify overcurrent/overvoltage/overpower on any given pin/component in the electrical circuit and wherein the current/voltage/power values are calculated by automatically extracting and utilizing at least one formula that calculates current/voltage/power outputs specified in at least one electrical documentation of at least one electrical component in the electrical circuit, compare it with actual connections in the electrical design representation and determining the actual current/voltage/power output.

8. The method of claim 1, wherein the inspection results output is configured to specify a list of warnings and/or best practices recommendations, based either on global rules or on selected user-defined rules.

9. The method of claim 1, wherein the inspection results output is configured to specify mismatch in footprint regarding any component in the electrical circuit.

10. The method of claim 1 wherein the inspection results output is an illustrative report depicting various faults as a visual representation.

11. The method of claim 1, wherein the inspection results output is configured to specify any violation of at least one instruction by which to connect a component's pins.

12. The method of claim 1, wherein the inspection results output is configured to specify any violation of at least one instruction by which to connect a component's thermal/exposed pad.

13. The method of claim 1, wherein the inspection results output is configured to specify any missing required pull-up/pull-down resistor, wherein the specification may be derived from a net/line function as part of a known communication protocol or be derived from an instruction that appears in at least one electrical documentation of at least one of the electrical components connected to that net/line.

14. The method of claim 1, wherein the electrical design inspection method is configured to specify any mix-up of lines according to known communication protocols, wherein a communication protocol and the individual pin roles are determined by the relevant components' documentation.

15. The method of claim 1, wherein the electrical design inspection method is configured to specify any parameter that exceeds its absolute maximum ratings/recommended operating conditions limits, wherein the conditions limits are determined by the relevant components' documentation.

16. The method of claim 1, wherein the electrical design inspection method is configured to specify any utilization of a component forming part of the electrical circuit which does not uphold known standards, wherein the specific standards to inspect are selected by the user via the user defined rules in the supplementary data.

17. The method of claim 1, wherein the electrical design inspection method is configured to present statistical data and analysis regarding the properties of at least one component forming a part of the electrical circuit represented in the electrical design.

18. The method of claim 1, wherein the electrical design inspection method is configured to specify an erroneous placement of a component over a ground plane in contradiction with a relevant components' documentation.

19. An Artificial Intelligence (AI) based system for electrical design inspection, comprising:

extraction data means for extracting data from at least one electrical documentation associated with at least one electrical component, such component being part of an electrical circuit represented in at least one electrical design representation, supplementary data sources wherefrom supplementary data concerning the electrical circuit and additional user defined rules selected for the inspection are extractible, conversion means whereby the data extracted by said data extraction means from at least one electrical documentation is convertible to a formal language, a controller coupled with said data extraction and conversion means that autonomously operating a design verification process by utilizing the converted and gathered data and outputting inspection results while employing AI models along with deterministic algorithms, wherein the data conversion means comprises an AI model, which is configured to analyze data written in a natural language and translate it to a standard formal language.

* * * * *